W. ELMENTHALER.
DIRECTION INDICATOR.
APPLICATION FILED SEPT. 10, 1914.
1,187,891.
Patented June 20, 1916.
2 SHEETS—SHEET 2.
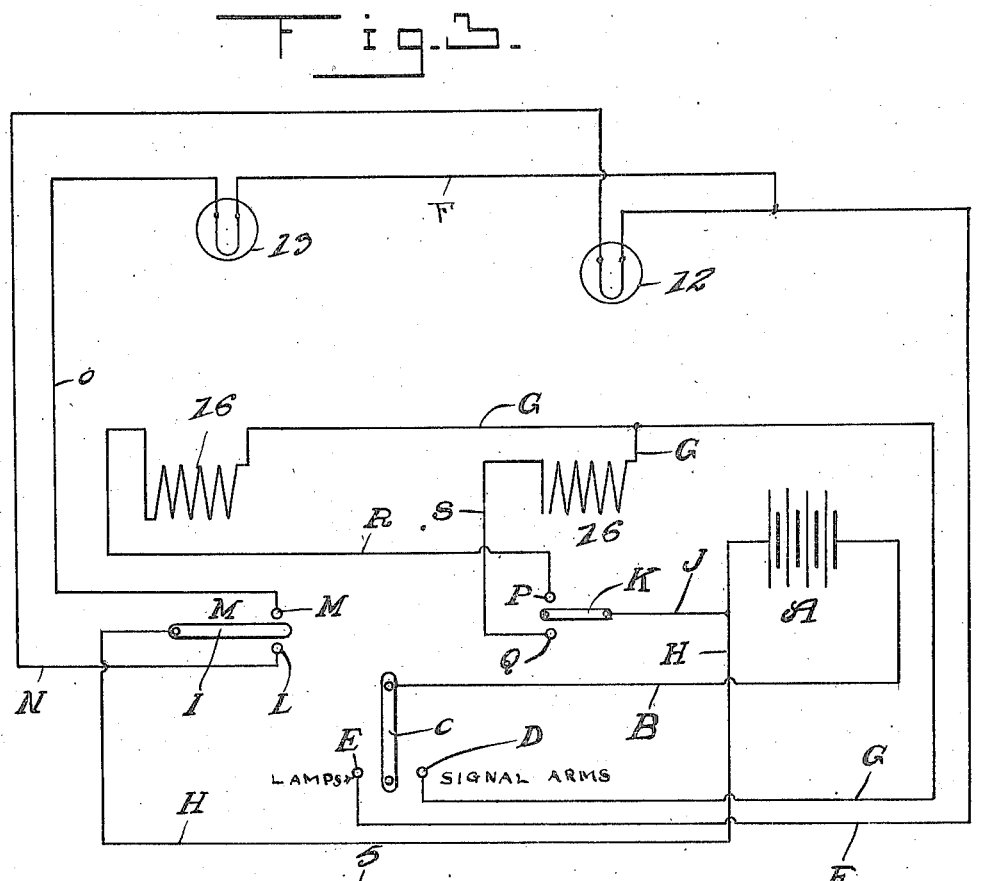
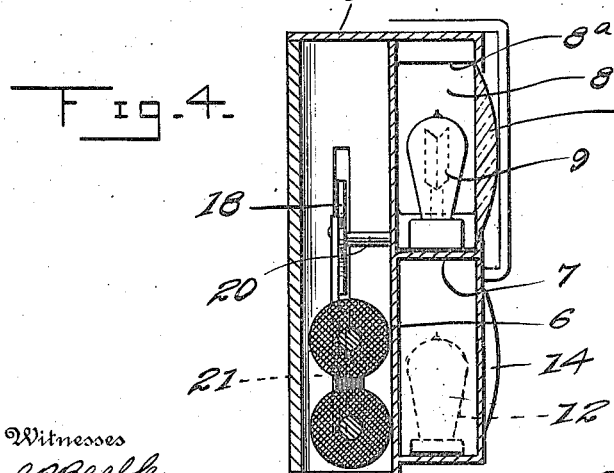
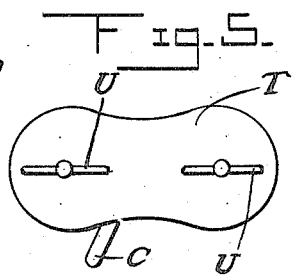
Inventor
W. Elmenthaler.

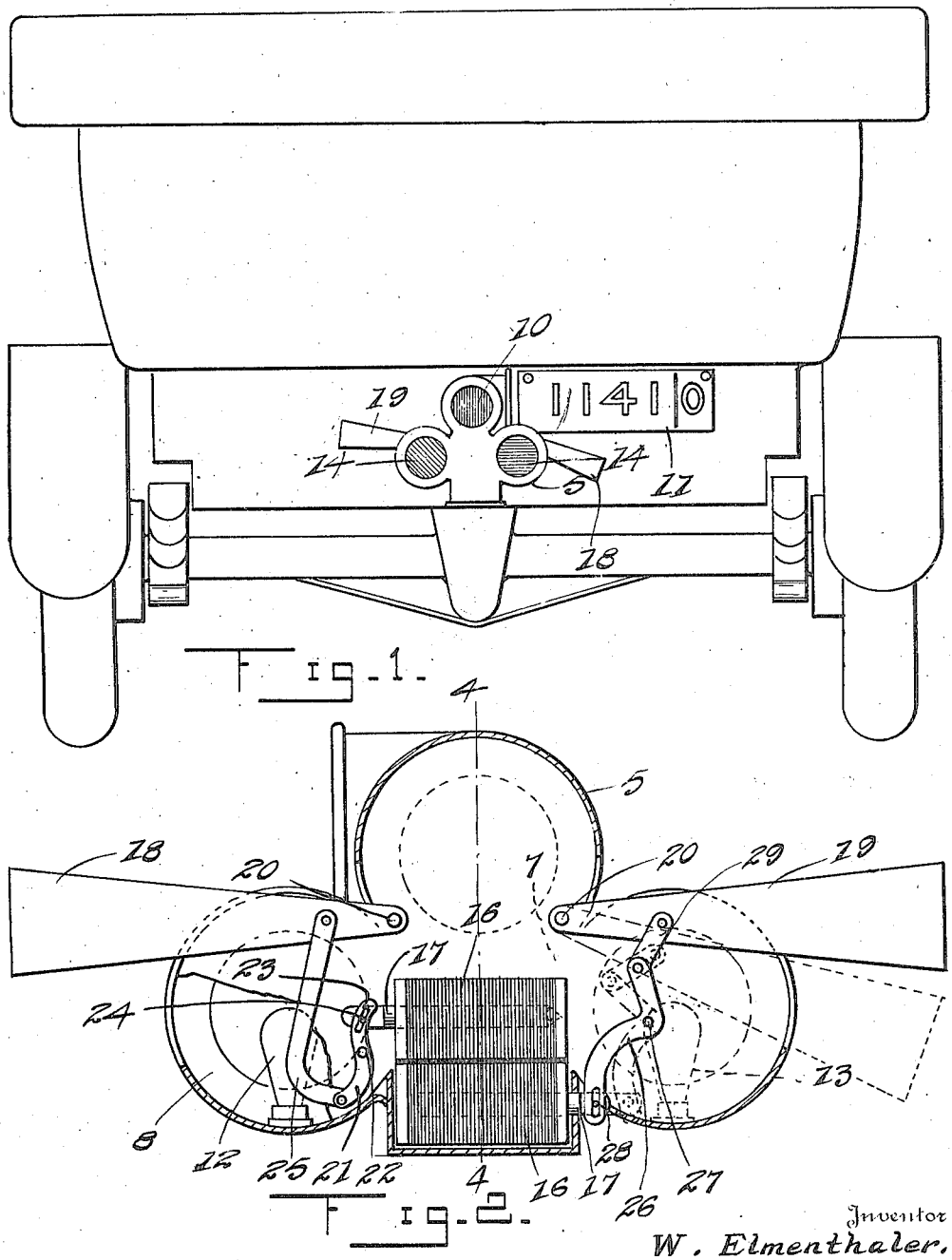

UNITED STATES PATENT OFFICE.

WILLIAM ELMENTHALER, OF CLEVELAND, OHIO.

DIRECTION-INDICATOR.

1,187,891. Specification of Letters Patent. Patented June 20, 1916.

Application filed September 10, 1914. Serial No. 861,089.

*To all whom it may concern:*

Be it known that I, WILLIAM ELMENTHALER, residing at Cleveland, in the county of Cuyahoga and State of Ohio, have invented certain new and useful Improvements in Direction-Indicators; and I do hereby declare the following to be a full, clear, and exact description of the invention, such as will enable others skilled in the art to which it appertains to make and use the same.

This invention has for its object to provide a direction indicator for motor vehicles including two independently and electrically operable sets of signals, one set being designed for use during the day and the other set being designed for use during the night.

With this and other objects in view, the invention consists in the novel construction, arrangement and formation of parts as will be hereinafter specifically described, claimed and illustrated in the accompanying drawings, in which:

Figure 1 represents a rear elevation of the direction indicator applied to use on a motor vehicle. Fig. 2 represents a horizontal sectional view, partly broken away, through the indicator. Fig. 3 represents a diagrammatic view of the electrical circuit for the indicator. Fig. 4 represents a vertical sectional view on the line 4—4 of Fig. 2, and Fig. 5 represents a front elevation of the switch box for opening and closing the circuits of the indicator.

Referring to the drawing in detail, wherein similar reference numerals designate corresponding parts throughout the several views, the numeral 5 indicates the housing or body of the indicator in which is arranged a vertically disposed partition 6 dividing the body or housing 5 into front and rear compartments. Partitions 7 are arranged between the partition 16 and the rear wall of the housing 6 and divide the latter into three non-communicating lamp chambers 8. In the upper chamber 8 a lamp 9 is arranged and a lens 10 of red glass is arranged in the rear wall of the housing 5 and constitutes a tail lamp for the motor vehicle. The upper lamp chamber 8 is also provided with a lateral opening through which the rays of light from the lamp 9 are reflected upon the license tag 11 of the vehicle. Right and left indicator lamps 12 and 13 respectively are arranged within the lower lamp chambers 8 rearwardly of different colored lenses 14 secured in suitable apertures formed in the rear wall of the housing 5.

A pair of solenoids 16 are arranged, one above the other, between the central partition 6 and the rear wall of the body or housing 5 and are provided with sliding armatures 17 slidable through the opposite open ends of said solenoids. Right and left hand signal arms 18 and 19, respectively, are pivotally mounted on the central partition 6 and are movable on horizontal axes 20. A lever 21 is pivotally secured at 22 to the partition 6 and is provided in its upper end with a longitudinally elongated opening 23 in which is mounted a pin 24 carried by the armature 17 of the upper solenoid. The lower end of the lever 21 is connected with the right hand signal arm 18 by an angular link 25. An angular lever 26 is pivotally secured at 27 to the partition 6 and is provided in its lower extremity with a longitudinally elongated opening receiving a pin 28 carried by the armature 17 of the lower solenoid 16. The upper extremity of the angular lever 26 is connected with the left hand signal arm 19, adjacent the pivotal axis of the latter, by a link 29.

The indicator is electrically operated by a battery A, or other suitable source of electromotive force, which is connected by a conductor B with a switch arm C movable over stationary contacts D and E. The contact E is connected with the right and left hand lamps 12 and 13, respectively, by a conductor F, and the contact E is connected with the right and left hand solenoids 16 by a conductor G. A conductor H connects the battery A with a second switch arm I, and a branch conductor J connects the conductor H with another switch arm K. The switch I is movable over contacts L and M, the contact L being connected by a conductor N with the right hand lamp 12 and the contact M being connected with the left hand lamp 13 by a conductor O. The switch arm K is movable over stationary contacts P and Q, the contact P being connected with one solenoid 16 by a conductor R and the other stationary contact Q being connected with the other solenoid 16 by a conductor S. The switch arms C, I and K are preferably mounted within a suitable switch box T arranged conveniently near the driver of the vehicle to which the indicator is attached, and said switch arms I and K are preferably operable by rotatable buttons or the like U.

In use, the indicator is preferably secured to the rear end of a motor vehicle, as illustrated in Fig. 1, and the license tag 11 is preferably arranged at a point adjacent the upper lamp chamber 8, whereby the rays of light from the tail lamp 9 will be reflected thereon and render the same clearly visible at night. During the day, the switch arm C is moved to the right to engage the contact D, thus closing one side of the circuit from the battery A to the solenoids 16 through the conductor G. In normal position, the signal arms 18 and 19 assume the inclined position illustrated in dotted lines in Fig. 2 and the armatures 17 are partially withdrawn from the solenoids 16. When the driver of the vehicle desires to turn to the right, the turn button U operating the switch arm K is rotated to engage said switch arm with the contact Q, thus closing the circuit from the battery A through the conductor H, branch conductor J, switch arm K, contact Q, conductor S, solenoid 16 operating the right hand signal arm 18, conductor G, contact D, switch arm C and conductor B. When the solenoid 16 operating the right hand signal arm 18 is energized, the armature 17 is drawn inwardly, rocking the lever 21 on its pivotal axis 22 and raising the signal arm 18 to a horizontal position through the angular link 25. When the circuit to the solenoid is broken the weight of the arm 18 throws the latter downwardly withdrawing the upper armature 17 from its solenoid 16 through the link 25 and lever 21. When the driver of the vehicle intends to turn to the left, the turn button U operating the switch arm K is rotated to engage said switch arm K with the contact P, thus closing the circuit to the solenoid 16 operating the left hand signal arm 19 from the battery A through the conductor H, branch conductor J, switch arm K, contact P, conductor R, solenoid 16, conductor G, contact D, switch arm C and conductor B. The lower solenoid 16 being energized, its armature 17 is drawn inwardly rocking the angular lever 26 upon its pivotal axis 27 and raising the left hand signal arm 19 to a horizontal position through the link 29. During the night, when the signal arms 18 and 19 are not clearly visible, the switch arm T is swung to the left to engage the contact E and thus, when the turn button U operating the switch arm I is rotated, the electrical circuit to the lamps 12 and 13 is closed to indicate the intended course of the vehicle.

What I claim is:

1. A direction indicator comprising a housing having a partition therein, lamps arranged on one side of said partition, signal arms pivotally mounted in said housing, electro-magnetic means for operating said signal arms, an electric battery, a pair of spaced relatively stationary contacts, an electrical connection between one of said contacts and said lamps, an electrical connection between the other contact and said electro-magnetic means, a switch arm movable over said contacts, an electrical connection between said switch and one side of said battery, a second pair of contacts, an electrical connection between each of the contacts of the second pair and one of said lamps, a second switch arm, an electrical connection between said switch arm and the opposite side of said battery, the second-mentioned arm being movable over the second pair of contacts, a third pair of contacts, an electrical connection between each of the contacts of the third pair and the electro-magnetic means controlling one of the signal arms, a switch arm movable over the contacts of the third mentioned pair, and an electrical connection between the third mentioned switch arm and the opposite side of said battery.

2. In a direction indicator, a housing, a pair of signal arms pivotally mounted in said housing and projecting outwardly of the opposite sides thereof, solenoids arranged one above the other in said housing and centrally below said signal arms, armatures slidably associated with said solenoids, a lever pivotally secured in said housing below the armature of the upper solenoid, and being pivotally connected with the latter, an angular link connecting said lever with one of said signal arms, an angular lever pivotally secured in said housing above the armature of the lower solenoid and being pivotally connected with said armature, and a link connection between the other signal arm and the angular lever.

In testimony whereof I affix my signature in presence of two witnesses.

WILLIAM ELMENTHALER.

Witnesses:
JAMES L. LIND,
PAUL SCHWAN, Jr.